UNITED STATES PATENT OFFICE.

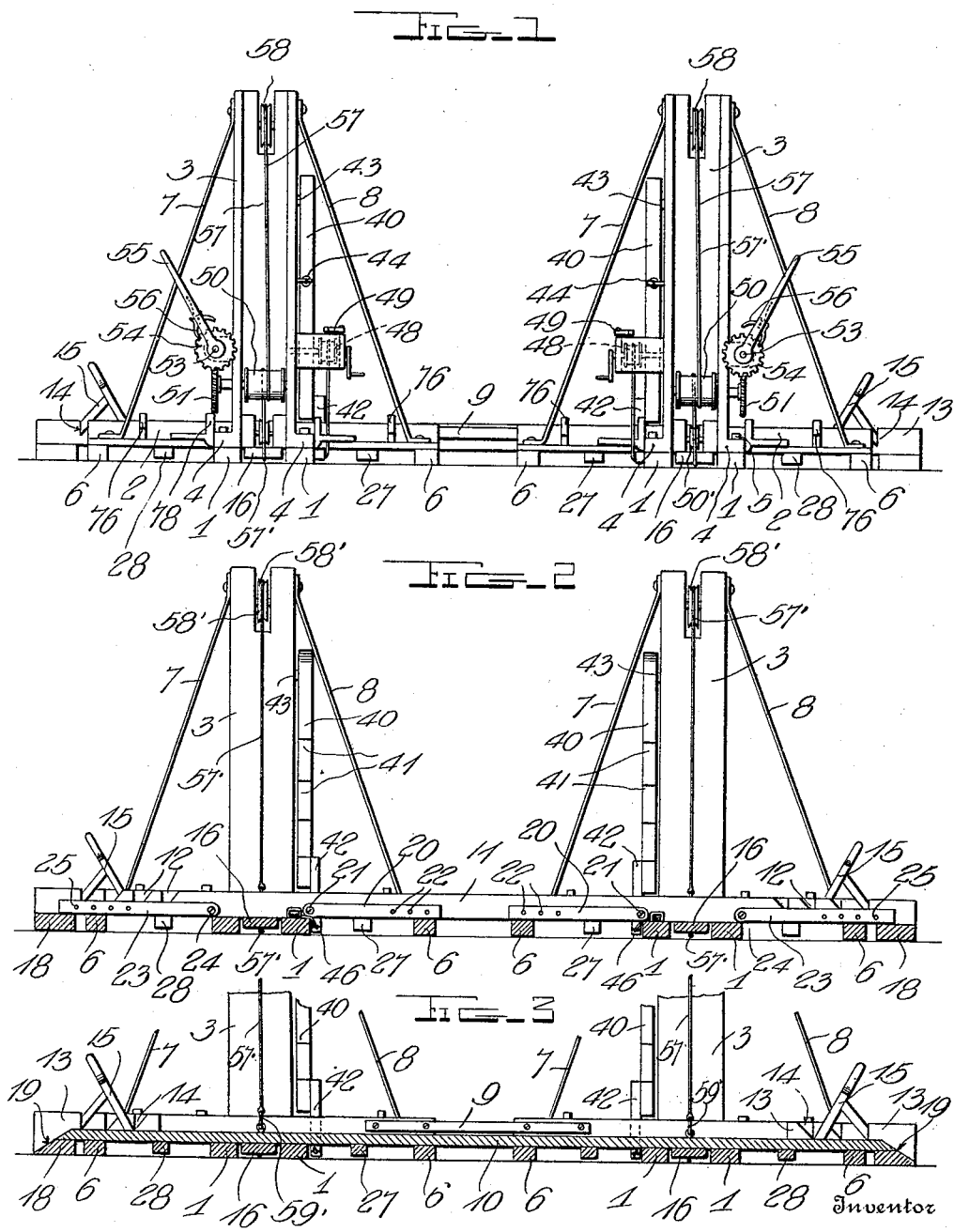

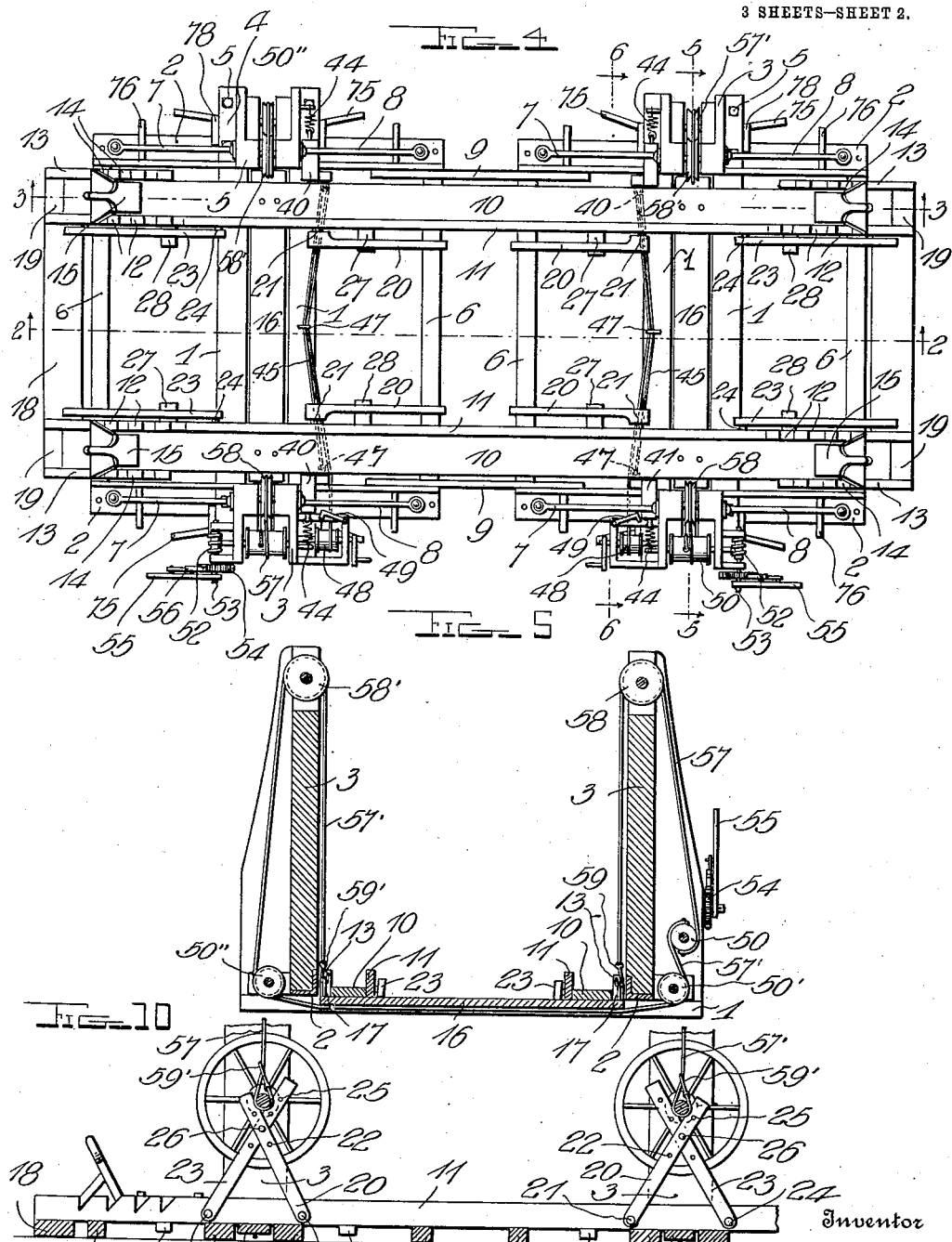

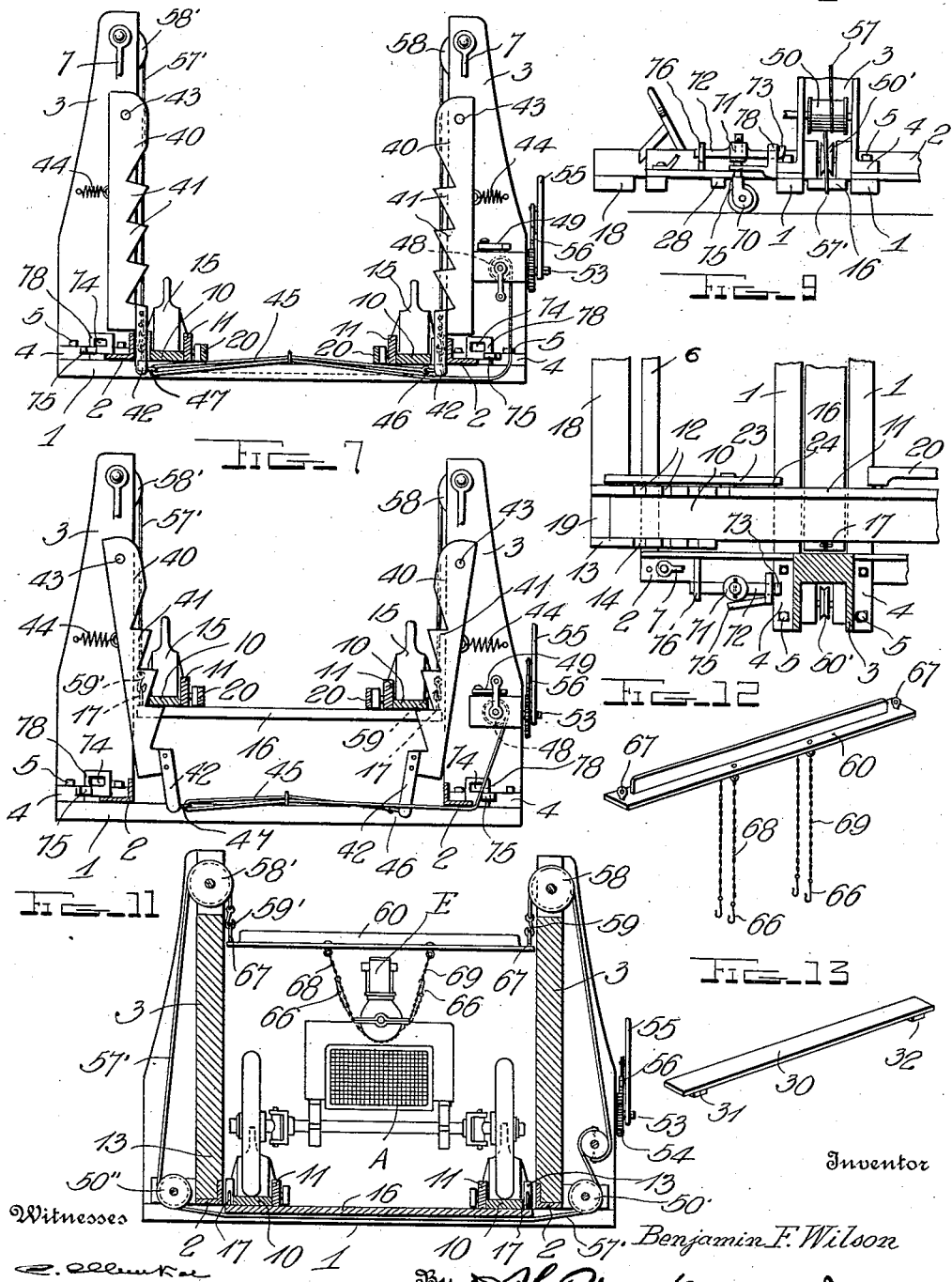

BENJAMIN F. WILSON, OF HASTINGS, NEBRASKA.

PORTABLE AUTOMOBILE-ELEVATOR.

1,077,180.  Specification of Letters Patent.  Patented Oct. 28, 1913.

Application filed November 26, 1912. Serial No. 733,725.

*To all whom it may concern:*

Be it known that I, BENJAMIN F. WILSON, a citizen of the United States, residing at Hastings, in the county of Adams and State of Nebraska, have invented certain new and useful Improvements in Portable Automobile-Elevators; and I do declare the following to be a full, clear, and exact description of the invention, such as will enable others skilled in the art to which it appertains to make and use the same.

This invention relates to elevators, and more especially to those intended for raising automobiles or the parts of automobiles, and the object of the same is to produce an elevator of this type made in two units each mounted on casters so that it may be moved about the floor, with means for connecting the two units into a single structure whereby an entire machine may be raised.

Other objects will appear from the following specification, and as shown in the drawings wherein—

Figure 1 is a side elevation. Figs. 2 and 3 are longitudinal sections on the lines 2—2 and 3—3 respectively of Fig. 4. Fig. 4 is a plan view of this machine complete. Figs. 5 and 6 are cross sections on the lines 5—5 and 6—6 respectively of Fig. 4, and Fig. 7 is a section similar to Fig. 6 with the stops drawn inward under the rails which are here elevated but a slight distance. Fig. 8 is a fragmentary detail in elevation, showing the caster mechanism, and Fig. 9 a fragmentary horizontal section through one of the uprights also showing the caster mechanism. Fig. 10 is a longitudinal section showing the trestles as set up. Fig. 11 is a cross section through two standards, illustrating how the T-bar can be used to raise the engine out of an automobile; and Fig. 12 is a perspective detail of said bar. Fig. 13 is a perspective detail of a bridge capable of use in connection with the ordinary lifting jack.

In the drawings my improved automobile elevator is shown as having its two units or parts connected into a complete structure resting on the floor of the workshop, excepting that Fig. 8 shows how the casters may be forced downward to raise the sills off of the floor. However, it will be explained below that by disconnecting the two units of which the frame structure is composed, the machine may be divided into two entirely independent members or units, each of which is movable on its four casters independently of the other.

I may say at the outset that the parts of this machine may be of suitable dimensions and materials, and changes in details may be made consistent with the scope of the appended claims.

Each unit is mounted on four sills extending transversely thereof, whereof two numbered 1, are a little longer than the other two, numbered 6. Overlying these sills and secured upon the shorter ones 6 at their extremities and upon the longer ones 1 near their extremities are L-shaped beams 2; while 3 designate upright U-shaped standards resting upon the outer horizontal flanges of the beams 2 and having feet 4 at their lower ends which are bolted as at 5 to the outer ends of the longer sills 1 as shown. The numerals 7 and 8 represent oblique braces for holding said standards rigidly in vertical position, the lower ends of said braces being connected with the upright flanges of the L-beams 2. The two structures thus built up are entirely separate of each other, but when they are to be united into an elevator as shown in the drawings their beams 2 are connected by bars 9 which are secured by rivets ar screws to their upright leaves as bent seen in Fig. 3. The following specification treats these units as so connected, and the entire structure as one.

The numeral 10 designates rails of which there are two, each having an upstanding flange 11 along its inner edge provided with notches 12 at its extremities and each also having a short section of flange 13 along its outer edge at its end, notched as at 14 opposite the notches 12, said registering notches being for the reception of chock blocks 15 as best seen in Figs. 1, 2 and 3, so shaped that they will engage two pairs of said notches simultaneously and firmly hold an automobile on the track even though but one end is elevated. The rails are connected by a pair of ties 16, each having a loop 17 at its extremity, and each tie preferably lies between two of the longer sills 1 so that said loops stand just inside of the standards as best seen in Fig. 5. The extremities of the rails are also connected by other ties 18 which may be beveled off opposite the ends of the rails to form approaches 19 as best seen in Fig. 3.

One feature of the present invention lies in the provision of trestles carried by said rails. Each consists of a relatively short bar 20 pivoted at 21 to the flanged edge of the rail as seen in Fig. 10 and having a series of holes 22 through its body, and a longer bar 23 pivoted at 24 to said rail and also having holes 25 in its body; and a pin or bolt 26 may be passed through any pair of said holes when the bars cross each other so as to produce a trellis or sawhorse shaped structure as seen in this view, into which the axle of an automobile may be laid or by which any other part may be sustained at a level higher than it would be sustained if supported solely by the rail 10. Normally these trellises lie upon stops 27 and 28 projecting inward from the two rails as best seen in Fig. 4, and they are entirely out of the way although always ready to be brought into use as described.

Another feature of this invention lies in the use of a bridge best seen in Fig. 13. This consists of a transverse bar or strip (metal or wood) as designated by the numeral 30, of a length to overlie the flanges 11 of the two rails, and blocks or stops 31 and 32 secured to and projecting below its lower face in such position that they will engage said flanges so as to prevent the dislocation of the bridge. Said stops are rather long—not mere pins or studs projecting downward from the bar—and therefore when they engage the inner faces of the flanges 11 the bridge cannot be turned accidentally upon the two rails. This bridge is useful for supporting the workman or more especially for resting an ordinary lifting jack thereon when some heavy part in the machinery needs to be raised at a point that is not immediately above one of the ties 16 or 18.

Another feature of this invention consists in the peculiar form of stops employed for holding the track elevated, as best illustrated in Figs. 4, 6, and 7. In the last two views the stops themselves are shown as upright bars 40 having teeth 41 along their inner edges and fingers 42 depending from their lower ends and resting inside the L-beams 2, the bars being pivoted at their upper ends as at 43 to the standards 3 and drawn normally outward at their lower ends by means of springs 44. Each pair of stop bars is connected by a rope or chain 45 secured at 46 to the lower end of one of said fingers, extending thence across and passing through an eye 47 at the lower end of the other of said fingers, and then returning and passing under the beam 2 and leading upward to a windlass 48 which is journaled in suitable bearings carried by the standard and whose crank handle is held, when the windlass has been wound up, by means of a catch or hook 49. It is obvious that when this windlass is wound to draw in on the rope, the latter swings the lower ends of the two stops inward as seen in Fig. 7 and their teeth 41 engage beneath the rails 10 so that the platform (consisting of said rails and the ties connecting them) is held elevated; but when the hook is released and the windlass allowed to unwind, the rope 45 is slackened and the springs 44 cause the stops to swing outward and release the platform as seen in Fig. 6.

The elevating mechanism best seen in Figs. 1, 4 and 5 consists of a windlass 50 journaled in suitable bearings in one of each pair of standards and having a worm gear 51 on its shaft, a worm 52 meshing therewith and mounted on a shaft 53 standing at right angles to the shaft of the windlass, a gear 54 fast on this shaft, a lever 55 loose on this shaft, and a double pawl 56 pivoted to the lever and adapted to be swung over into either of two positions so that the reciprocation of the lever will turn the gear and worm in either direction and wind up the windlass or unwind it as desired. Coacting with this windlass is a pair of ropes, one of which numbered 57 leads upward over a pulley 58 in the top of the standard 3 and downward to a hook 59 which is engaged with the loop 17 at that end of the tie 16, while the other rope 57' leads downward under a pulley 50', along beneath the tie 16 and under another pulley 50'' at the base of the opposite standard, thence upward over a pulley 58' at the top of that standard and downward to another hook 59' engaging the opposite loop 17. So that when the lever is reciprocated, with the pawl standing in proper position to cause the drum of the windlass to wind on the two ropes, the latter will raise both rails or tracks simultaneously, but when the pawl is thrown over to the other position the reciprocation of the lever causes the drum to unwind the ropes and the platform is permitted to descend. I prefer to employ a worm gear and worm in this connection because ordinary loads will not have sufficient weight to drive the windlass drum in a reverse direction against such a connection between it and its operating lever.

Another feature of this invention lies in the use of what is here called the "T-bar" best seen in Figs. 11 and 12. This consists of a bar 60 which is preferably T-shaped in cross section to give it considerable strength and of a length to fit loosely between the flat inner faces of the two opposite standards 3, loops or eyes 67 rising from its extremities and adapted to be engaged with the hooks 59 and 59' at the lower ends of the two ropes as seen in Fig. 11, and two sets of chains 68 and 69, preferably having hooks 66 at their extremities, depending from its body so that they may be passed beneath an engine E or other element of an automobile A when the latter rests on the rails as seen in Fig. 11, their hooks 66 engaged with certain links in the lapping chains, and the entire T-bar raised by the windlass mechanism above described. This detail is serviceable for lifting an engine or other heavy part out of an automobile while the latter rests on the platform and the platform rests on the floor. This detail also coacts with the detail of construction above described (the making of the framework in two separable units) to the extent that if an engine were so raised out of an automobile, the latter might be run off of the rails, the connecting bars 9 detached from the beams 2 and the units separated, and then the unit wherein the engine was swung could be moved to a point where such engine could receive suitable treatment. For this purpose I provide the detail next to be described.

In Figs. 8 and 9 is best shown how I make provision for mounting each unit of the framework on casters. The numeral 70 designates broadly any suitable type of caster, the shank of which is journaled in an eye 71 at the center of the short lever 72, and the inner end of said lever is hooked as at 73 and loosely engages an eye 74 in a casting 78 which is secured to the base of the standard, said casting also having a finger 75 against which the shank of the caster stands when said caster is in active position as seen in Fig. 8. The other end of the lever 72 at this time engages under a hook 76 in the casting as shown. There are four of these casters for each unit, one at either side of each standard, and it follows that when the units are disconnected by detaching the connecting bars 9, each set of four casters will support its unit so that the latter may be moved about the floor.

With this construction of parts, ordinarily the units stand connected as seen in Figs. 1, 2, 3, and 4, and when an automobile is to be elevated the platform is lowered so that the approach strikes the ground or floor and the automobile is run onto the rails 10 alongside their flanges 11. The chock blocks 15 are then put in place, and two operators manipulate the levers 55 so that the windlasses 50 wind up on the ropes and both ends of both rails are raised in unison. When the platform consisting of the connected rails has been raised to a sufficient height, usually to permit the workman or workmen to pass beneath the automobile, the stops 40 are swung inward by winding up the windlasses 48, so that the parts stand as seen in Fig. 7. If it should so happen that but one end of the automobile is to be raised, it is obvious that only one of the levers 55 is manipulated and one end of the rails 10 is elevated. If it be some heavy part of the automobile, such as the engine E, which is to be raised off the chassis, the automobile is run on the platform which is allowed to remain resting upon the sills or floor, and the device shown in Fig. 12 is brought into use as shown in Fig. 11 and already explained. If the engine or other part so raised out of the automobile or off of its chassis is to be conveyed to a remote point, after lifting it as herein illustrated the automobile is run off the platform, the tracks raised so that their ties disengage the sills, and the whole track structure moved out of the remainder, then the units are disconnected at the points 9, 9, and the casters on that unit carrying the engine are thrown downward as seen in Fig. 8 so that the unit becomes a truck for carrying the engine or other part to the point where it is to be repaired or worked on. So also when it is desired to transport the elevator as a whole, or without any load in it, the casters are thrown downward by properly depressing the levers 72 and hooking their free ends under the hooks 76, whereby the elevator becomes portable in a manner which will be clear. Or, perhaps the engine may be raised out of the automobile to move the automobile out of the framework, and then run a truck into the latter and let the engine down onto the truck.

In Fig. 10 is shown how the trellises are employed, as for supporting the axles of an automobile, for instance, above the rails 10 as the latter lie upon the sills; and the provision of a plurality of holes 22 and 25 through both the bars of each trellis permits the bolts 26 to be put through at a number of points so that the supporting angle can be made higher or lower as desired.

While I have referred herein to the elements 45 and 57 as ropes and the elements 68 and 69 as chains, it will be obvious that either might be ropes or even chains without departing from the principle of my invention.

What is claimed as new is:

1. The herein described portable elevator composed of two units, each comprising a plurality of cross sills, a pair of parallel beams connecting them, standards rising from the intermediate sills, and elevating mechanism mounted on each unit, and a set of caster wheels carried by each unit and adapted to be borne downward into contact with the floor; combined with connecting bars detachably connecting the beams of said units, a platform of a length to extend over the sills of both units and across the space between them and of a width to stand between the uprights of each unit, and means for attaching said platform to the elevating mechanisms.

2. The herein described portable elevator composed of two units, each comprising a plurality of cross sills, a pair of parallel beams connecting them; standards rising from the intermediate sills, and elevating mechanism mounted on each unit; combined with connecting bars detachably connecting said units, a platform of a length to extend over the sills of both units and across the space between them and of a width to stand between the uprights of each unit, means for attaching said platform to the elevating mechanisms, a beveled approach beneath each end of the platform adapted to stand beyond the endmost of said sills, and chock blocks adjustably mounted on the platform near its end.

3. In an elevator, the combination with the base, a pair of U-shaped standards rising therefrom, pulleys journaled in the upper ends of said standards, pulleys journaled in said base at the lower ends of said standards, and a vertically movable platform between said standards; of ropes connected at their extremities with said platform and rove thence over said uppermost pulleys, one rope passing under both said lowermost pulleys, a windlass around whose drum said ropes are wound in opposite directions, an operating lever, a worm and worm gear mechanism connecting said lever and windlass, stop bars pivoted at their upper ends to said standards and having teeth in their inner edges, springs drawing the lower ends of said stop bars outward, and means for drawing the lower ends inward.

4. In an elevator, the combination with the base, a pair of standards rising therefrom, pulleys journaled in the upper ends of said standards, pulleys journaled in said base at the lower ends of said standards, and a vertically movable platform between said standards; of ropes connected at their extremities with said platform and rove thence over said uppermost pulleys, one rope passing under both said lowermost pulleys, a windlass around whose drum said ropes are wound in opposite directions, an operating lever, a worm and worm gear mechanism connecting said lever and windlass, stop bars pivoted at their upper ends to said standards and having teeth in their inner edges, springs drawing the lower ends of said stop bars outward, fingers depending from the lower ends of said bars, a rope connected with one finger and led across to and through an eye in the lower end of the other finger, and thence back below the first-named finger, a windlass around which this rope is passed, and a hook for engaging its crank, for the purpose set forth.

5. In an elevator, the combination with a base, a pair of standards, a platform movable vertically between them, and means for raising said platform, of a pair of stop bars pivoted at their upper ends to said standards and having teeth on their inner edges adapted to engage beneath said platform, springs drawing the lower ends of said stop bars normally outward, fingers depending from their lower extremities, a rope connected with one finger and led across to and through an eye in the finger of the other bar, and thence back beneath the first-named stop bar, a windlass around whose drum said rope is wound, and a hook adapted to engage the crank-handle of said windlass, for the purpose set forth.

6. In an elevator of the class described, the combination with a base, a pair of standards rising therefrom, pulleys journaled in the upper ends of said standards, an elevating mechanism, and ropes leading therefrom over said pulleys and having hooks at their extremities; of a platform vertically movable between said standards, loops rising therefrom and adapted to be engaged by said hooks, a cross bar of T-shaped section having loops at its extremities, and a plurality of chains depending from said bar and having hooks at their lower ends, for the purpose set forth.

7. In a portable elevator, the combination with a base structure, standards rising therefrom, an elevating mechanism carried by one standard, and a platform; of four caster wheels for such structure, an eye in which the shank of each wheel is mounted, a lever carrying said eye and having a hook at one extremity, a casting having an eye with which said hook engages and a finger against which the shank of the caster wheel rests, and a hook beneath which the remote end of the lever engages when the caster wheel is depressed to raise the base of said structure off the ground.

8. In an elevator of the class described, the combination with the elevating mechanism, and a platform adapted to be raised thereby and including parallel rails; of a bridge comprising a bar of a length to span said rails, and stops secured beneath said bar near its extremities and engaging the inner edges of the rails, for the purpose set forth.

In testimony whereof I have hereunto set my hand in presence of two subscribing witnesses.

BENJAMIN F. WILSON.

Witnesses:
ERNEST HOEFFNER,
E. L. YOUNGBLOOD.